April 14, 1970     C. D. FLAMAND     3,506,753
MELT-SPINNING LOW VISCOSITY POLYMERS
Filed April 7, 1967
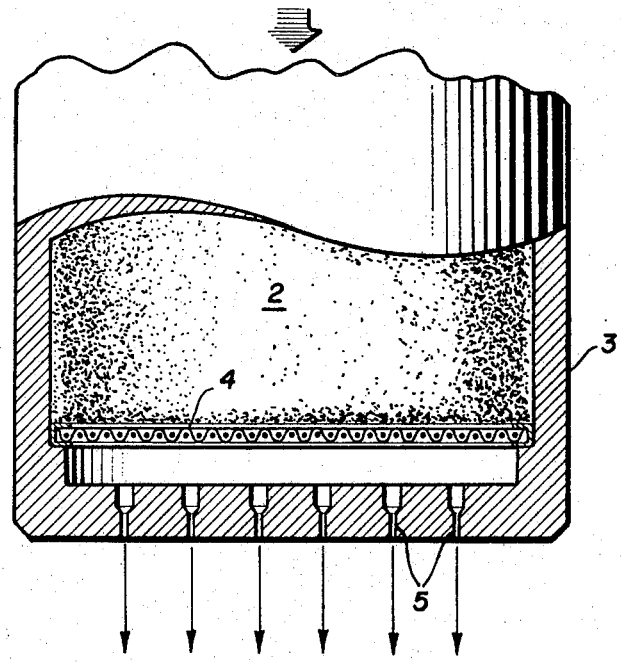
INVENTOR.
CHARLES D. FLAMAND

United States Patent Office 3,506,753
Patented Apr. 14, 1970

3,506,753
MELT-SPINNING LOW VISCOSITY POLYMERS
Charles D. Flamand, Pensacola, Fla., assignor to Monsanto Company, St. Louis, Mo., a corporation of Delaware
Filed Apr. 7, 1967, Ser. No. 629,236
Int. Cl. B28b 3/20
U.S. Cl. 264—176                                6 Claims

ABSTRACT OF THE DISCLOSURE

This invention relates to melt-spinning polymers of low relative viscosity into high quality filaments by a process which includes subjecting the molten polymer to high shear and then extruding the sheared polymer at a low jet velocity.

BACKGROUND OF THE INVENTION

Filaments of thermoplastic polymers such as polyamides are conventionally formed by continuously providing molten polymer from a melter or continuous polymerization apparatus and extruding the molten polymer under pressure through a capillary or capillaries in a spinneret plate. It is common practice in such melt-spinning processes to shear the molten polymer in order to uniformly lower its viscosity prior to extrusion through the capillaries, for example by passing the polymer (generally downwardly and under pressure) through a bed of finely divided solids which often include sand or other finely divided, inert particulate substance. The solids may be situated in a single substantially homogeneous layer or in a plurality of adjacent homogeneous layers that vary in average particle size in the direction of polymer flow and are generally enclosed within a container and supported therein by a wire mesh or perforated plate screen that prevents passage of the solids into the spinneret capillaries. In most cases, a bed of solids and a spinneret plate are combined in apparatus known as a spinneret pack which can be handled as a unit for insertion in or removal from a melt-spinning installation.

Polymers such as polyamides that have been of substantial commercial importance for fiber production in the past are generally characterized by a relative viscosity (RV) of at least 30, that is, a viscosity at least 30 times as great as that of formic acid, as determined, for example, by measuring the efflux time of an 11 wt. percent solution of the polymer in a 90% solution of formic acid in water at 25° C. in a size 300 Cannon-Fenske CFRU viscometer and multiplying the efflux time in seconds by a factor that inversely represents the efflux time of formic acid in the particular viscometer in use. Since accurate measurement of the formic acid efflux rate is difficult, the viscometer factor is generally determined by calibration with aqueous glycerine solutions. More particularly, the viscometer factor is obtained by dividing the density of the 11% polymer solution at 25° C. (1.19 grams/cc.) by the absolute viscosity of the 90% formic acid solution at 25° C. (1.55 centipoises) and multiplying the value thus obtained by the average of the glycerine factors for 80% and 85% solutions of glycerine in water at 25° C. The factor for each glycerine solution is obtained by dividing the absolute viscosity of that solution at 25° C. (45.86 centipoises for the 80% solution; 81.5 centipoises for the 85% solution) by the product of the density of that solution at 25° C. (1.20925 grams/cc. for the 80% solution; 1.22255 grams/cc. for the 85% solution) and the efflux time in seconds of that solution at 25° C. in the viscometer in use.

Quite recently, a demand has developed for filamentary products made from polymers that have substantially lower viscosities than those customarily employed heretofore and, in particular, certain polymers having relative viscosities of less than about 25. However, the severe filament quality problems that have been encountered in spinning such polymers have made it appear that conventional melt-spinning techniques might not be satisfactorily adaptable for use with polymers of such low viscosities. For example, filaments produced from such polymers in conventional melt-spinning operations have been characterized by an undesirably high number of breaks per unit of length or weight, and further processing (such as draw-twisting) of the yarn has been normally accompanied by a commercially unacceptable proportion of breaks and wraps, i.e., in excess of the generally recognized commercial standard of about 0.1 breaks and wraps per pound of yarn.

In the absence of an attractive alternative to a melt-spinning process for the formation of fibers from such low viscosity polymers, a process whereby such melt-spinning can be satisfactorily carried out is highly desirable, and it is an object of this invention to provide such a process.

SUMMARY OF THE INVENTION

It has now been discovered that very satisfactory filaments characterized by high internal quality and superior performance during processing can be produced from a thermoplastic polymer having a relative viscosity of less than about 25 by subjecting the polymer in molten form to high shear and then extruding it through a spinneret capillary at a low jet velocity. Thus, the present invention comprises a process for preparing high quality filaments from a molten thermoplastic polymer having a relative viscosity of less than about 25 which comprises passing a stream of said polymer through a bed of finely divided solids in which the shear effect on the polymer in said stream is sufficient to provide a pressure drop on the polymer as it passes through the bed of at least about 2500 pounds per square inch, and then extruding the sheared molten polymer in the form of continuous filaments at a jet velocity, measured in feet per minute, of not more than about 12D–48, wherein D is the spun denier per filament.

DESCRIPTION OF THE DRAWING

The invention will be more readily understood by reference to the following detailed description taken in conjunction with the accompanying drawing, which is a sectional elevation of a portion of a spinneret pack with which the process of this invention can be carried out. Referring to the drawing, molten polymer is fed downwardly (as shown by the upper arrow) into a bed of finely divided solids 2 (usually sand) tightly packed in a sand holder 3 and supported therein by a fine mesh screen 4 that prevents passage of the solids into the spinneret capillaries 5. The polymer is fed under pressure sufficient to force it downward at a desired rate of flow through solids 2 and screen 4 and then extrude it through capillaries 5, the outlet ends of which are at substantially atmospheric pressure. Shortly after emerging from capillaries 5, the strands of extruded polymer are solidified by cooling, forming continuous filaments which are taken up by means well known in the art and processed further, if desired, such as by conventional drawtwisting.

DETAILED DESCRIPTION OF THE INVENTION

The shear effect on the polymer as it passes through a substantially homogeneous layer of finely divided solids is a function of the average rate at which shear planes in the polymer pass each other in the layer of solids and the length of time during which the polymer is subjected to such shear. It is dimensionless and may be calculated by use of the equation $$\text{Shear effect} = kqV/Ar \qquad (I)$$

in which $q$ is the flow rate of molten polymer through the layer of solids in grams per minute, $A$ is the cross-sectional area of the solids in square inches, $V$ is the volume of the solids in the layer in milliliters, $r$ is the average pore radius of the solids in feet, and $k$ is a proportionality and unit conversion factor of $7.9 \times 10^{-6}$. The shear effect on polymer passing through a bed of solids comprised of a plurality of substantially homogeneous layers that vary in average particle size in the direction of polymer flow can be calculated by adding the shear effects of the individual layers as calculated by Equation I.

The magnitude of the shear effect that is needed for practice of the present invention will vary with other factors affecting the pressure drop through the solids bed, and in particular with the melt viscosity of the specific polymer being sheared. To carry out the process with a given solids bed pressure drop, higher shear effects will be used with polymers of lower melt viscosity and, conversely, lower shear effects will be adequate with polymers of higher melt viscosity. Thus, the shear effect that is necessary in carrying out the process of this invention will be considerably greater than the shear effects that have been adequate with similar pressure drops and flow rates of polymers having relative viscosities substantially higher than 25 and correspondingly high melt viscosities.

In general, the most desirable pressure drop across the solids bed will be nearly as high as the equipment in use will conveniently permit. With most spinneret packs in present use, a pressure drop between about 2500 and about 6000 p.s.i. will be generally employed, and the range of from about 3500 to about 5500 will be preferred in most cases. The shear effect required for the desired pressure drop with a given flow rate of a specific polymer is generally most conveniently determined from an empirically derived relationship of shear effects and pressure drops observed under otherwise-similar conditions. Although a desired shear effect can be obtained by altering any of the variables on the right side of Equation I, it is preferably controlled in most instances by changing the quantity of solids in the bed and/or by replacing at least a portion of the solids in the bed with other solids having an appropriately larger or smaller average pore radius. In general, sand and other fine solids that pass through a 40 mesh and not a 270 mesh (per inch) screen provide best results, although larger or smaller particle sizes can be employed if desired. Individual layers of solids in the bed are normally made up of particles having a relatively narrow size range, for example, a solids fraction that passes through a 200 mesh but not a 230 mesh screen.

After the molten polymer has been suitably sheared, it is extruded through the spinneret capillaries at a jet velocity which, in accordance with the present invention and as measured in feet per minute, is not more than about 12D–48, wherein D is the spun denier per filament, that is, the denier per filament after extrusion and solidification but prior to further processing (e.g., drawtwisting) which would affect the filament denier substantially. Low viscosity polymers of the type for which the processing of this invention is particularly suitable are generally spun into filaments having a spun denier of up to about 25, and most frequently between about 5 and about 20, although higher denier filaments of such polymers are also suitable for some uses. The jet velocity at which the sheared polymer is extruded from a spinneret capillary is a measure of its volumetric rate of flow from the capillary and, for purposes of this disclosure and the appended claims, is expressed in feet per minute and calculated by dividing the polymer flow rate in terms of its spun volume by the cross-sectional area of the capillary or capillaries through which it is extruded. Although the jet velocity employed in spinning a given polymer can be measured in any of a variety of ways, it is generally most conveniently calculated from measurements of the spinning speed, the spun denier per filament, and the capillary diameter of the spinneret in use. For example, the jet velocity employed in spinning of polyhexamethylene adipamide can be readily obtained by use of the following equation:

$$\text{Jet velocity (ft./minute)} = KDS/d^2 \qquad (II)$$

in which $D$ is the spun denier per filament, $S$ is the spinning speed in yards per minute, $d$ is the capillary diameter in inches, and $K$ is a proportionality and unit conversion factor of $6.35 \times 10^{-7}$.

In general, the most appropriate spinning speeds, spun deniers and capillary diameters for use in operation with a desired jet velocity are interrelated and dependent on other process variables such as, for example, the properties of the particular polymer being melt-spun. Thus, in a specific embodiment of the invention in which the polymer is polyhexamethylene adipamide and a spinning speed of from about 1000 to about 1700 yards per minute is employed, advantageous jet velocities can usually be obtained with the use of spinneret capillaries having diameters of at least about 16 mils when the spun denier is 5.7, at least about 12 mils when the spun denier is 9.6, and at least about 9 mils when the spun denier is 20.

Although the process of this invention can be used in melt-spinning of a variety of polymeric substances having viscosities in the previously conventional ranges, it is particularly useful in production of filamentary products from thermoplastic polymers characterized by low viscosity, in particular a relative viscosity of less than about 25, and, in especially useful embodiments, an even lower relative viscosity of less than about 20. Such low viscosity polymeric substances can be substantially wholly comprised of one or more polyamides, one or more other thermoplastic fiber-forming polymers, or a mixture (preferably substantially homogeneous) of one or more polyamides and one or more other thermoplastic fiber-forming polymers. In a specific embodiment, the process is very suitably employed in melt-spinning of low viscosity polymeric substances that contain polyamides of the type prepared by polymerizing a monoamine-monocarboxylic acid (e.g., aminocaproic acid) or a mixture containing a diamine (e.g., hexamethylenediamine) and a dibasic acid (e.g., adipic acid). Among the various polyamides which are normally characterized by an RV of less than 25 and which are most suitably melt-spun by the process of this invention are those formed by carrying out the polymerization in the presence of excess dicarboxylic acid to provide a polymeric product that has a relatively low affinity for acid dyes. In an even more specific example, the low viscosity polymers that can be very satisfactorily melt-spun by the process of this invention include those prepared by polymerizing a polyamide-forming substance in the presence of sufficient excess dicarboxylic acid to provide a polyamide having between 15 and 30 gram-equivalents of titratable amine end groups per $10^6$ grams of polymer, and particularly those containing from 20 to 28 gram-equivalents of amine end groups per $10^6$ grams of polymer. By the expression "titratable amine end groups per $10^6$ grams of polymer" is meant the number of gram-equivalents of —$NH_2$ ends per $10^6$ grams of polymer as determined by the method of G. B. Taylor and J. E. Waltz, Analytical Chemistry, volume 19, page 448 (1947).

The following specific examples are included to further illustrate the process of this invention for producing high quality filaments from low viscosity polymer. However, it will be readily apparent to those skilled in the art that the invention can be employed in the melt-spinning of other low viscosity polymeric substances and can be carried out, when desired, with equipment and conditions other than those used in the examples.

EXAMPLE I

This example illustrates a conventional process for melt-spinning a polymer having a relative viscosity greater than 25.

Polyhexamethylene adipamide having a relative viscosity of 29 (before spinning) was heated to 290° C. and the resulting molten polymer was passed downwardly at a rate of 14.2 grams per minute through a conventional spinneret pack of the general type illustrated in the drawing. The sand bed in the spinneret pack provided a shear effect of 45 on the polymer, as calculated by Equation I, and the pressure drop on the polymer as it passed through the bed was approximately 3500 p.s.i. After emerging from the bottom of the bed by passage through a fine mesh metal screen by which the sand was supported, the molten polymer was evenly distributed across the upper face of a horizontal spinneret plate containing 13 identical capillaries each having a diameter of 9 mils and a length of 12 mils and extruded through the 13 capillaries at a jet velocity of 90 feet per minute. The 13 strands of molten polymer emerging from the capillaries were solidified by cooling, providing filaments having a spun denier of 9.6. The filaments were collected at a speed of 1209 yards per minute. After application of a conventional finish solution, the yarn was drawn at a ratio of 3.22 and room temperature to provide a 40 denier thread line. The yarn had an RV of 38, internal quality of 0.193 breaks per pound, as determined by passing the drawn yarn through cleaner blades having a clearance of 0.003 inch, and a drawtwist performance rating of 0.094 breaks and wraps per pound.

EXAMPLE II

This example illustrates the use of a conventional process as described in Example I for melt-spinning a polymer having an RV of less than 25.

When the procedure of Example I was substantially duplicated with the exception that the RV of the polymer was 20 (before spinning) and additional sand was employed to provide a shear effect of 45, the pressure drop on the polymer passing through the bed was approximately 1000 p.s.i., the internal quality of the yarn was 0.377 break per pound, and its drawtwist performance was 0.638 break and wraps per pound. The relative viscosity of the yarn was 22.

EXAMPLE III

This example illustrates the melt-spinning of a polymer having an RV of less than 25 by use of a higher shear effect in the process described in Example I.

When the procedure of Example I was substantially duplicated with a polymer having an RV of 18 (before spinning) except for the use of a sand bed that provided a shear effect of 97.6, the pressure drop on the polymer passing through the bed was approximately 3750 p.s.i., the internal quality of the yarn was 0.108 break per pound, and its drawtwist performance rating was 0.246 break and wraps per pound. The RV of the yarn was 20.

EXAMPLE IV

This example illustrates the melt-spinning of a polymer having an RV of less than 25 with the use of a higher shear effect than that employed in Example III.

When the procedure of Example III was substantially duplicated except for the use of a sand bed that provided a shear effect of 130, the pressure drop on the polymer passing through the bed was approximately 5000 p.s.i., the internal quality of the yarn was 0.086 break per pound, and its drawtwist performance rating was 0.301 break and wraps per pound. The RV of the yarn was 20.

EXAMPLE V

This example illustrates the use of the process of this invention in melt-spinning a polymer having an RV of less than 25.

When the procedure of Example IV was substantially duplicated except that the spinneret capillaries each had a diameter of 11 mils and a length of 25 mils, and the jet velocity of the polymer through each capillary was thereby lowered to 61 feet per minute, the internal quality of the yarn was 0.061 break per pound and its drawtwist performance rating was 0.045 break and wraps per pound. The RV of the yarn was 20 and its tensile strength was adequate for commercial knitting use (approximately 25% less than the yarn produced in Example I).

EXAMPLE VI

This example further illustrates the use of the process of this invention in melt-spinning a polymer having an RV of less than 25.

When the procedure of Example V was substantially duplicated except that the spinneret capillaries each had a diameter of 22 mils and a length of 187 mils, and the jet velocity of the polymer through each capillary was thereby lowered to 15 feet per minute, the internal quality of the yarn was 0.054 break per pound and its drawtwist performance rating was 0.052 break and wraps per pound. The RV of the yarn was 20 and its tensile strength was adequate for commercial knitting use (approximately 25% less than the yarn produced in Example I).

Although the process of this invention has been described with preferred embodiments, many modifications and variations thereof may be employed without departing from the spirit and scope of the invention. Accordingly, it is to be understood that the invention is not limited to such specific embodiments except as it is defined in the appended claims.

I claim:

1. A process for spinning high quality filaments from a molten polyamide having a relative viscosity of less than about 25 which comprises passing a stream of said polyamide through a bed of finely divided solids in which the shear effect on the polyamide is sufficient to provide a pressure drop on the polyamide as it passes through the bed of at least about 2500 pounds per square inch, and then extruding the sheared molten polyamide in the form of continuous filaments at a jet velocity, measured in feet per minute, of not more than about 12D–48, wherein D is the spun denier per filament.

2. A process, as defined in claim 1, in which the pressure drop on the polyamide is between about 2500 and about 6000 pounds per square inch.

3. A process, as defined in claim 1, in which the spun denier per filament is between about 5 and about 20.

4. A process, as defined in claim 1, in which the polyamide contains between 15 and 30 gram-equivalents of titratable amine end groups per $10^6$ grams of polymer.

5. A process, as defined in claim 1, in which the polyamide is polyhexamethylene adipamide.

6. A process, as defined in claim 1, in which the relative viscosity of the polyamide is less than about 20.

References Cited

UNITED STATES PATENTS

| | | |
|---|---|---|
| 2,266,363 | 12/1941 | Graves. |
| 2,266,368 | 12/1941 | Hull et al. |
| 2,883,261 | 4/1959 | McGeorge. |
| 3,197,533 | 7/1965 | Robinson et al. _ _ _ _ _ _ 264—176 |
| 3,387,327 | 6/1968 | Privett et al. |
| 3,104,419 | 9/1963 | LaForge. |
| 3,118,012 | 1/1964 | Kilian. |

FOREIGN PATENTS

| | | |
|---|---|---|
| 928,825 | 1963 | Great Britain. |
| 1,449,751 | 7/1966 | France. |

OTHER REFERENCES

"Mechanical Principles of Polymer Melt Processing," by Pearson, pp. 52–63, 138 and 139. Pergamon Press, London, 1966.

DONALD J. ARNOLD, Primary Examiner

J. H. WOO, Assistant Examiner

U.S. Cl. X.R.

18—8